US011316187B2

(12) United States Patent
Robertson et al.

(10) Patent No.: US 11,316,187 B2
(45) Date of Patent: Apr. 26, 2022

(54) FUEL CELL STACK ASSEMBLY APPARATUS AND METHOD

(71) Applicant: Ceres Intellectual Property Company Limited, West Sussex (GB)

(72) Inventors: Alan Hadleigh Robertson, West Sussex (GB); Andrew Ballard, West Sussex (GB); Eren Erturk, West Sussex (GB); Tomasz Domanski, West Sussex (GB)

(73) Assignee: Ceres Intellectual Property Company Limited, West Sussex (GB)

( * ) Notice: Subject to any disclaimer, the term of this patent is extended or adjusted under 35 U.S.C. 154(b) by 98 days.

(21) Appl. No.: 17/033,288

(22) Filed: Sep. 25, 2020

(65) Prior Publication Data

US 2021/0098811 A1    Apr. 1, 2021

(30) Foreign Application Priority Data

Sep. 26, 2019    (GB) ..................................... 1913907

(51) Int. Cl.
*H01M 8/248*    (2016.01)
*H01M 8/249*    (2016.01)

(52) U.S. Cl.
CPC ........... *H01M 8/248* (2013.01); *H01M 8/249* (2013.01)

(58) Field of Classification Search
CPC .. H01M 8/247; H01M 8/2475; H01M 8/2485; H01M 8/249; H01M 8/24; H01M 8/2465
See application file for complete search history.

(56) References Cited

U.S. PATENT DOCUMENTS

| 7,012,495 B2 | 3/2006 | Underwood et al. |
| 7,794,890 B2 | 9/2010 | Rock et al. |

(Continued)

FOREIGN PATENT DOCUMENTS

| EP | 1689015 A1 | 8/2006 |
| EP | 2339665 B1 | 5/2016 |

(Continued)

OTHER PUBLICATIONS

RU Rospatent; Decision to Grant a Patent for a Utility Model dated Feb. 20, 2021 for Application No. 2020131228/09 and an English translation thereof.

(Continued)

*Primary Examiner* — Imran Akram
(74) *Attorney, Agent, or Firm* — Snell & Wilmer L.L.P

(57) ABSTRACT

A fuel cell stack assembly apparatus comprising a base and a stack alignment feature extending generally perpendicular to said base for aligning ferritic fuel cell units stacked against it into a fuel cell stack assembly, wherein each fuel cell unit comprises a respective first alignment feature complimentary in shape to said stack alignment feature. Other features include a magnetic abutment extending generally perpendicular to said base for attracting the plurality of fuel cell units towards the stack alignment feature, and an alignment slider slidable generally perpendicular to said base for aligning ferritic fuel cell units stacked against the stack alignment feature. A method of using the assembly apparatus comprises stacking fuel cell units upon each other on the base with their respective first alignment features against the stack alignment feature, and attracted towards the same by virtue of the magnetic force of the at magnetic abutment.

21 Claims, 15 Drawing Sheets

(56) References Cited

U.S. PATENT DOCUMENTS

| | | | |
|---|---|---|---|
| 8,663,865 B2 | 3/2014 | Watanabe et al. | |
| 8,722,275 B2 | 5/2014 | Kwok et al. | |
| 9,203,125 B2 | 12/2015 | Bronczyk et al. | |
| 9,583,747 B2 | 2/2017 | Baek et al. | |
| 2009/0117414 A1* | 5/2009 | Ringel | H01M 8/021 |
| | | | 429/468 |
| 2018/0263557 A1* | 9/2018 | Kahlman | H04B 5/0012 |
| 2018/0366765 A1* | 12/2018 | Lee | H01M 10/0486 |
| 2019/0140302 A1* | 5/2019 | Lee | H01M 8/0438 |
| 2020/0185729 A1* | 6/2020 | Yoon | H01M 8/021 |
| 2020/0274118 A1* | 8/2020 | Fees | H01M 50/20 |

FOREIGN PATENT DOCUMENTS

| | | |
|---|---|---|
| JP | 2000048849 A | 2/2000 |
| JP | 2006147232 A | 6/2006 |
| JP | 2008059875 A | 3/2008 |
| JP | 2008123760 A | 5/2008 |
| JP | 2010113997 A | 5/2010 |
| JP | 2012069333 A | 4/2012 |
| RU | 2138885 C1 | 9/1999 |
| WO | 0235628 A1 | 5/2002 |
| WO | 03075382 A2 | 9/2003 |
| WO | 2004089848 A1 | 10/2004 |
| WO | 2005078843 A1 | 8/2005 |
| WO | 2006079800 A1 | 8/2006 |
| WO | 2006106334 A1 | 10/2006 |
| WO | 2007085863 A1 | 8/2007 |
| WO | 2007110587 A2 | 10/2007 |
| WO | 2008001119 A2 | 1/2008 |
| WO | 2008003976 A1 | 1/2008 |
| WO | 2008015461 A1 | 2/2008 |
| WO | 2008053213 A1 | 5/2008 |
| WO | 2008104760 A1 | 9/2008 |
| WO | 2008132493 A2 | 11/2008 |
| WO | 2009090419 A2 | 7/2009 |
| WO | 2010020797 A1 | 2/2010 |
| WO | 2010061190 A2 | 6/2010 |
| WO | 2015004419 A1 | 1/2015 |
| WO | 2015136295 A1 | 9/2015 |
| WO | 2016083780 A1 | 6/2016 |
| WO | 2016124928 A1 | 8/2016 |
| WO | 2016124929 A1 | 8/2016 |
| WO | 2016128721 A1 | 8/2016 |

OTHER PUBLICATIONS

GBIPO; Combined Search and Examination Report dated Feb. 19, 2020 for United Kingdom Patent Application No. 1913907.0.

* cited by examiner

FUEL CELL STACK ASSEMBLY APPARATUS AND METHOD

CROSS-REFERENCE TO RELATED APPLICATION

This application claims the benefit of United Kingdom Application No. 1913907.0, filed Sep. 26, 2019, and entitled FUEL CELL STACK ASSEMBLY APPARATUS AND METHOD, the contents of which are hereby incorporated herein by reference, to the extent such contents do not conflict with the present disclosure.

SCOPE OF THE INVENTION

The present invention is concerned with fuel cell stack assembly apparatus, and methods of fuel cell stack assembly using same.

BACKGROUND OF THE INVENTION

Teachings of fuel cells, fuel cell stacks, fuel cell stack assemblies, and heat exchanger systems, arrangements and methods are well known and include WO02/35628, WO03/075382, WO2004/089848, WO2005/078843, WO2006/079800, WO2006/106334, WO2007/085863, WO2007/110587, WO2008/001119, WO2008/003976, WO2008/015461, WO2008/053213, WO2008/104760, WO2008/132493, WO2009/090419, WO2010/020797, WO2010/061190, WO2015/004419, WO2015/136295, WO2016/124929, WO2016/124928, WO2016/128721 and WO2016/083780.

Significant challenges in mechanical, electrical and thermal design are encountered when designing SOFC (solid oxide fuel cell) stacks, as the stacks are required to be in compression for electrical connectivity, gas sealing, and maintenance of structural integrity for assembly, movement and operation, undergo significant thermal cycling and need to maintain integrity over life time of operation.

Metal supported solid oxide fuel cell stack assemblies typically comprise a metal base plate, at least one solid oxide fuel cell stack mounted on the base plate, a metal end plate, each at least one fuel cell stack arranged mounted between the base plate and the end plate, and (each at least one fuel cell stack) comprising at least one fuel cell stack layer, each at least one fuel cell stack layer comprising at least one fuel cell and at least one electrically insulating compression gasket. Individual fuel cell stack layers can also be referred to as "fuel cell units".

In the prior art, such solid oxide fuel cell components of metal supported solid oxide fuel cell (SOFC) stack assemblies are often held in compression with the use of multiple tie-bars running from the base plate, through guide holes in the at least one fuel cell stack and through the end plate where they are secured with locking nuts.

Due to the proximity of the tie-bars to the edges of the guide holes (i.e., to the edges of the metal components which define the guide holes in the at least one fuel cell stack), careful design consideration is required as there is a risk of short circuit between the tie-bars and the stack when the components expand at high temperatures in potentially mixed atmosphere involving steam, reacted and unreacted hydrocarbons and air.

During manufacture of the fuel cell stack assembly, assembly bars (having a larger diameter than the tie-bars) are inserted through the guide holes in the at least one fuel cell stack to achieve alignment of the fuel cells whilst the stack is first assembled. The assembly bars are then removed and replaced with the tie-bars which have a smaller diameter than the assembly bars. The end plate is then added to the top of the at least one fuel cell stack, and compression means are used to compress the fuel cell stack assembly. With the fuel cell stack assembly compressed, locking nuts are then added. The compressive load is then removed from the stack, leaving the tie-bars to maintain the stack compression. Maintaining the compression load over the operating temperature range of the fuel cell stack can be a challenge depending on the compression load required, the number of fuel cell stack layers—and hence tie-bar length, and suitable materials to make the tie-bar from. Having to have tie-bars of differing design for different stack designs can add complexity and cost.

The tie-bars also add to the thermal mass of the fuel cell stack assembly and take up space in the fuel cell units which could otherwise be used.

It is also highly desirable to improve the fuel cell stack assembly process by e.g., making it more modular, simpler, standardised and/or to automate the process.

EP1689015B1, JP2000048849A (JP19980217090), JP2006147232 (JP2004333056) JP2008059875A (JP20060234743), JP2008123760A (JP20060304394), JP2010113997A (JP20080286772), JP2012069333A (JP20100212139), U.S. Pat. No. 7,794,890B2, U.S. Pat. No. 8,663,865B2, and U.S. Pat. No. 8,722,275B2 disclose aspects of fuel stack assembly processes.

The present invention seeks to address one or more of the known disadvantages.

SUMMARY OF THE INVENTION

According to a first aspect of the present invention there is provided fuel cell stack assembly apparatus comprising:
(i) a base; and,
(ii) a stack alignment feature extending generally perpendicular to the base for aligning a plurality of ferritic fuel cell units stacked against it into a fuel cell stack assembly, wherein each fuel cell unit comprises a respective first alignment feature complimentary in shape to the stack alignment feature; and,
(iii) at least one magnetic abutment extending generally perpendicular to the base for attracting the plurality of fuel cell units towards the stack alignment feature.

In use, the fuel cell stack assembly (incorporating an at least one fuel cell stack) is formed (assembled) on the assembly apparatus, with the first alignment feature of the fuel cell units aligned with (for example, mated with) the complimentary stack alignment feature of the assembly apparatus.

The assembly apparatus base can, for example, be in the form of a base plate.

The fuel cell stack assembly can for example comprise a fuel cell stack base plate and a fuel cell stack end plate. Alignment means for one or both of the fuel cell stack base plate and the fuel cell stack end plate can be provided. In certain embodiments, at least one of the fuel cell stack base plate and the fuel cell stack end plate comprise an alignment feature complimentary in shape to the stack alignment feature. In other embodiments, other alignment means are provided for the fuel cell stack base plate and/or the fuel cell stack end plate.

The stack alignment feature can comprise an alignment block. For example, it comprises a first alignment member and a second alignment member. Each of the stack alignment feature first and second alignment members can comprise a protrusion. Thus, the protrusions of the first and second alignment members can mate with the first alignment feature (of each fuel cell unit).

The ferritic fuel cell units can be fabricated from a ferromagnetic metal, such as a ferritic steel, or a ferritic stainless steel. The present invention can apply to metal-supported fuel cell units such as metal-supported solid oxide fuel cell units.

At least one magnetic abutment can comprise at least two magnetic abutment blocks. Each magnetic abutment block can define a forward face which is positioned to in-use abut the ferritic fuel cell units when their first alignment feature is aligned with (e.g., mated with) the complimentary stack alignment feature.

The fuel cell stack assembly apparatus can additionally comprise a back plate attached to the base. The at least one magnetic abutment can be mounted upon the back plate.

The at least one magnetic abutment can be activatable for selectively exerting a magnetic alignment force on the plurality of fuel cell units. For example, the at least one magnetic abutment is operable to switch between a first "on" state in which (in use) the fuel cell units are attracted (towards the at least one magnetic abutment), and a second "off" state in which there is (in use) a reduced attraction of the fuel cell units towards the at least one magnetic abutment.

In certain embodiments, the at least one magnetic abutment is a permanent magnet that is activatable by altering its position or orientation. In other embodiments, the at least one magnetic abutment is a magnet that is activatable by operation of an electric current, optionally selected from an electromagnet, electropermanent magnet or other switchable permanent magnetic device.

In certain embodiments, the at least one magnetic abutment comprises a rotatable rod which is rotatable about its longitudinal axis which extends generally perpendicular to the base of the fuel cell stack assembly apparatus. The (north-south) magnetic axis of the rod can be generally perpendicular to the longitudinal axis of the rotatable rod. In one embodiment, in the "on" state, the (north-south) magnetic axis of the at least one magnetic abutment can be generally in-use perpendicular to the longitudinal axis of the fuel cell units (i.e., the longitudinal axis of the base). In the "off" state, the (north-south) magnetic axis of the at least one magnetic abutment can be generally parallel to the longitudinal axis of the fuel cell units (i.e., the longitudinal axis of the base).

In another embodiment, electrical current can be provided to electromagnets to switch them to the "on" state, and electrical current can be turned off to switch them to the "off" state.

In other embodiments, arrangements of magnets such as electropermanent magnets (EPMs) can be used. In other embodiments, magnetic bases can be used. In other embodiments, switchable permanent magnetic devices such as those of US7012495 can be used.

Thus, in-use the fuel cell units can be attracted towards (i.e., are urged towards) the at least one magnetic abutment when in the "on" state.

Conversely, when the at least one magnetic abutment there is in the "off" state, the in-use attraction of fuel cell units towards the at least one magnetic abutment is reduced.

Thus, when the at least one magnetic abutment comprises permanent magnets, the magnetic abutment blocks can be actuated between (i.e., are actuable between or switchable between):

(i) a first "on" state (a first position) in which the (north-south) magnetic axis of the at least one magnetic abutment can be generally perpendicular to the longitudinal axis of the base of the fuel cell stack assembly apparatus, and (ii) a second "off" state (a second position) in which the (north-south) magnetic axis of their magnets can be generally parallel to the longitudinal axis of the base of the fuel cell stack assembly apparatus.

With the at least one magnetic abutment switchable between first and second ("on" and "off") states/positions, it can be placed in the "on" position (or state) during assembly in order to assist with locating/positioning of fuel cell units and current collectors, attracting (urging) them towards themselves and the stack alignment feature. When alignment of the fuel cell units has been completed, the at least one magnetic abutment can be placed in or switched to the "off" position or state.

The stack alignment feature can comprise a male feature for engagement with a female shaped first alignment feature (i.e., the complimentary first alignment feature is female shaped). The first alignment feature is in the form of a notch or recess.

In certain embodiments, the stack alignment feature can comprise an expansion mechanism and/or rotatable mechanism adapted to move outwardly within the first alignment feature of the plurality of fuel cell units for further alignment thereof. Thus, the fit between the first alignment feature of the fuel cell units and the stack alignment feature can be such that assembly can be readily and quickly performed, particularly by an automated assembly apparatus such as an assembly robot. When that initial assembly has been performed, the expansion mechanism can be actuated to expand within the first alignment feature of the fuel cell units, causing enhanced alignment.

In certain embodiments, the stack alignment feature can comprise two elongate members extending generally perpendicular to the base at least one of which is rotatable and/or expandable away from the other. This can for example be used to achieve further alignment during compression of the fuel cell units or fuel cell stack assembly.

For example, the expansion mechanism can comprise an expansion member comprising a rotatable member, for example a rotatable alignment member or protrusion. For example, where the stack alignment feature comprises an alignment block comprising first and second alignment members, one of the first and second alignment members may be rotatable.

In certain embodiments, the fuel cell stack assembly apparatus can further comprise an alignment slider mounted for sliding movement generally perpendicular to the base against the plurality of fuel cell units for further alignment thereof. In particular, the alignment slider may be mounted for sliding movement along the stack alignment feature, optionally in the gap defined between it and the adjacent respective first alignment features of the plurality of fuel cell units.

Thus, after the fuel cell units have been placed on the assembly apparatus with the first alignment feature of the fuel cell units aligned with the stack alignment feature, further alignment can be effected using the alignment slider. With the at least one magnetic abutment attracting (urging) the fuel cell units, movement of the alignment slider along the stack alignment feature can cause fuel cell units to be pushed away from the stack alignment feature and magnetic abutment. However, this movement can be resisted by the attraction between the magnetic abutment and the fuel cell units, limiting movement of the fuel cell units and resulting in an enhanced alignment of the fuel cell units.

In embodiments comprising first and second alignment members, the alignment slider can be slidably movable (e.g., along a support bracket) between the first and second alignment members, for example between the protrusions of the first and second alignment members. A channel can be defined between the first and second alignment members, for example between their protrusions. The alignment slider can be movable along the channel. The alignment slider can comprise a forward protrusion, for example a forward member defining an alignment face, which in use extends forward of the stack alignment feature toward the first alignment feature of the plurality of fuel cell units when they are aligned with one another.

In embodiments comprising both an expansion mechanism (and/or rotatable mechanism) and an alignment slider, the expansion mechanism (and/or rotatable mechanism) can be actuated before use of the alignment slider. Alternatively, it may be actuated after the further alignment step (above) has been performed using the alignment slider.

In certain embodiments, the alignment slider comprises an expansion member. The alignment slider can comprise a rotatable member, such as a rotatable alignment member or protrusion. The alignment slider can comprise first and second forward members defining an alignment face, which in use extends forward of the stack alignment feature toward the first alignment feature of the plurality of fuel cell units when they are aligned with one another. One of the first and second forward members can be rotatable.

Thus, the alignment slider expansion member can be actuated to exert force upon the first alignment feature of the fuel cell units, thus enhancing alignment of the individual fuel cell units.

In certain embodiments, the fuel cell stack assembly apparatus further comprises a magnetic slider mounted for sliding movement generally perpendicular to the base against the plurality of fuel cell units for further alignment thereof, and optionally mounted (such as against opposed sides of the plurality of fuel cell units) so as to exert a magnetic force acting perpendicular to the magnetic force of the at least one magnetic abutment.

The expansion mechanism and the alignment slider expansion member can be used when assembling tall fuel cell stacks. Thus, one or both of them can be provided for assembly apparatus which is dimensioned for the assembly of fuel cell stack assemblies comprising at least 50, at least 75, or at least 100 fuel cell units.

In embodiments comprising an alignment slider or magnetic alignment slider, the alignment slider and/or magnetic slider can be slidably mounted on a rail and supported by a spring mechanism providing an upward return force.

In certain embodiments of the present invention, a guide member is provided on the base, or extending away therefrom, for assisting in positioning the plurality of fuel cell units. This can be useful during assembly, compression and/or removal.

A second aspect of the present invention provides a fuel cell stack assembly apparatus comprising:
(i) a base; and,
(ii) a stack alignment feature extending generally perpendicular to the base for aligning a plurality of ferritic fuel cell units stacked against it into a fuel cell stack assembly, wherein each fuel cell unit comprises a respective first alignment feature complimentary in shape to the stack alignment feature; and,
(iii) an alignment slider slidable generally perpendicular to the base for aligning a plurality of ferritic fuel cell units stacked against the stack alignment feature.

A third aspect of the present invention provides a method of manufacture of a fuel cell stack assembly using fuel cell stack assembly apparatus according to the first or second aspect of the present invention, wherein the method comprises the steps of:
(i) stacking a plurality of fuel cell units, and optional additional components, upon each other on the base with their respective first alignment features against the stack alignment feature, and attracted towards the same by virtue of the magnetic force of the at least one magnetic abutment;
(ii) and optionally, in the case of apparatus wherein the stack alignment feature comprises an expansion mechanism and/or rotatable mechanism, performing a further alignment step by moving the expansion mechanism and/or rotatable mechanism outwardly within the first alignment feature of the plurality of fuel cell units for further alignment thereof;
(iii) and optionally, in the case of apparatus further comprising an alignment slider and/or magnetic slider, performing a further alignment step by sliding the alignment slider and/or magnetic slider against the plurality of fuel cell units for further alignment thereof.

In certain embodiments, the method comprises the steps of:
(a) positioning one on top of another on the assembly base:
(1) a first compression member,
(2) a fuel cell stack base plate, and
(3) the plurality of fuel cell units,
wherein the first alignment feature of each of the plurality of fuel cell units is aligned with the stack alignment feature;
(b) positioning one on top of another on the plurality of fuel cell units:
(1) a fuel cell stack end plate, and
(2) a second compression member; and
(c) applying a compressive force through the first compression member and the second compression member (i.e., applying a compressive load on the fuel cell stack base plate, the plurality of fuel cell units, and the fuel cell stack end plate) using a compression means.

In embodiments where the stack alignment feature comprises an expansion mechanism and/or rotatable mechanism, the further alignment step can be performed before step (c). In certain embodiments, it is performed between steps (a) and (b).

Similarly, in embodiments where the apparatus further comprising an alignment slider and/or magnetic slider, the further alignment step can be performed before step (c). In certain embodiments, it is performed between steps (a) and (b).

In certain embodiments where the assembly apparatus comprises an alignment slider (or magnetic slider), it is slid from a first position above the first compression member, the fuel cell stack base plate and the plurality of fuel cell units to a second position adjacent and abutting the plurality of fuel cell units.

In certain embodiments, the at least one magnetic abutment is activatable and the magnetic alignment force is selectively exerted during an assembly step and subsequent compression step, but not during a final removal step.

The at least one magnetic abutment can be operable to switch between a first "on" state in which (in use) the fuel cell units are attracted towards the at least one magnetic abutment, and a second "off" state in which there is (in use) a reduced attraction of the fuel cell units towards the at least one magnetic abutment.

In certain embodiments, prior to step (a), the at least one magnetic abutment is actuated or switched to the first ("on") state. Step (a) can be performed with the at least one magnetic abutment in the first ("on") state. After step (c), the at least one magnetic abutment can be actuated or switched to the second "off" state.

Step (a) can comprises placing the various components one on top of another and aligning them with (aligning them using) the stack alignment feature.

The compression means can be attached on, to or between the first compression member and the second compression member, and compressive force applied using the compression means. In certain embodiments, the compression means comprises a plurality of threaded rods which are attached between the first compression member and the second compression member, compressive force being applied by tightening a retaining nut. The retaining nut can be tightened such that a desired compressive force is applied. At least one threaded rod can be attached at a first end to the first compression member, and passes through the second compression member, and a retaining nut is attached at a second end of the threaded rod and tightened so as to apply compressive force between the first compression member and the second compression member.

In other embodiments, the compression means comprises a compression device and retaining means, the compression device being used to effect a desired compression (i.e., exert a desired compressive force through the first and second compression members), and the retaining means being configured such that upon removal of the compression device, the compressive force applied through the first compression member and the second compression member is maintained through tensile forces in the retaining means.

Thus, in certain embodiments step (c) comprises:
(i) applying a compressive force through the first compression member and the second compression member using a compression device; and
(ii) attaching retaining means on, to or between the first compression member and the second compression member, the retaining means configured such that upon removal of the compression means, the compressive force applied through the first compression member and the second compression member is maintained through tensile forces in the retaining means.

Where a compression device and retaining means is used, step (c) can additionally comprise:
(iii) removing the compression device.

Thus, a compressive load can be exerted on the plurality of fuel cell units.

Thus, the end product can be the fuel cell stack assembly retained between the first and second compression members. In such a state, it is then suitable for storage, movement, or additional manufacturing steps such as additional compression and the attachment of a skirt or skirt members to the fuel cell stack base plate and fuel cell stack end plate to contain the fuel cell stack, and maintain the compressive forces applied through the first compression member and the second compression member through tensile forces in the skirt. At such a stage, the retaining means and the first and second compression members can be removed.

The fuel cell stack assembly can additionally comprise at least two current collectors, e.g., a negative power take-off plate and a positive power take-off plate. Thus, at step (a) a current collector can be aligned between the fuel cell stack base plate and the plurality of fuel cell units, and a current collector can be aligned between the plurality of fuel cell units and the fuel cell stack end plate.

At least one of the fuel cell stack base plate and the fuel cell stack end plate can comprise the first alignment feature.

The stack alignment feature can be contacted by either the fuel cell stack end plate or the second compression member. Thus, in embodiments comprising an alignment slider or magnetic slider, movement of the alignment slider or magnetic slider can be effected by placing the fuel cell stack end plate and the second compression member on top of the alignment member, and moving them downwards towards the fuel cell units. Downwards movement of the fuel cell stack end plate and the second compression member can then be continued such that they are positioned one on top of another on the plurality of fuel cell units. Compressive force can then be exerted.

Reference now will be made in detail to embodiments of the invention, one or more examples of which are set forth below. Each example is provided by way of explanation of the invention, not limitation of the invention.

DETAILED DESCRIPTION

Various modifications and variations can be made in the present invention without departing from the scope of the claims.

Other objects, features, and aspects of the present invention are disclosed in the remainder of the specification. What follows is a description of exemplary embodiments only and is not intended as limiting the broader aspects of the present invention.

Embodiment 1

Figure 1:
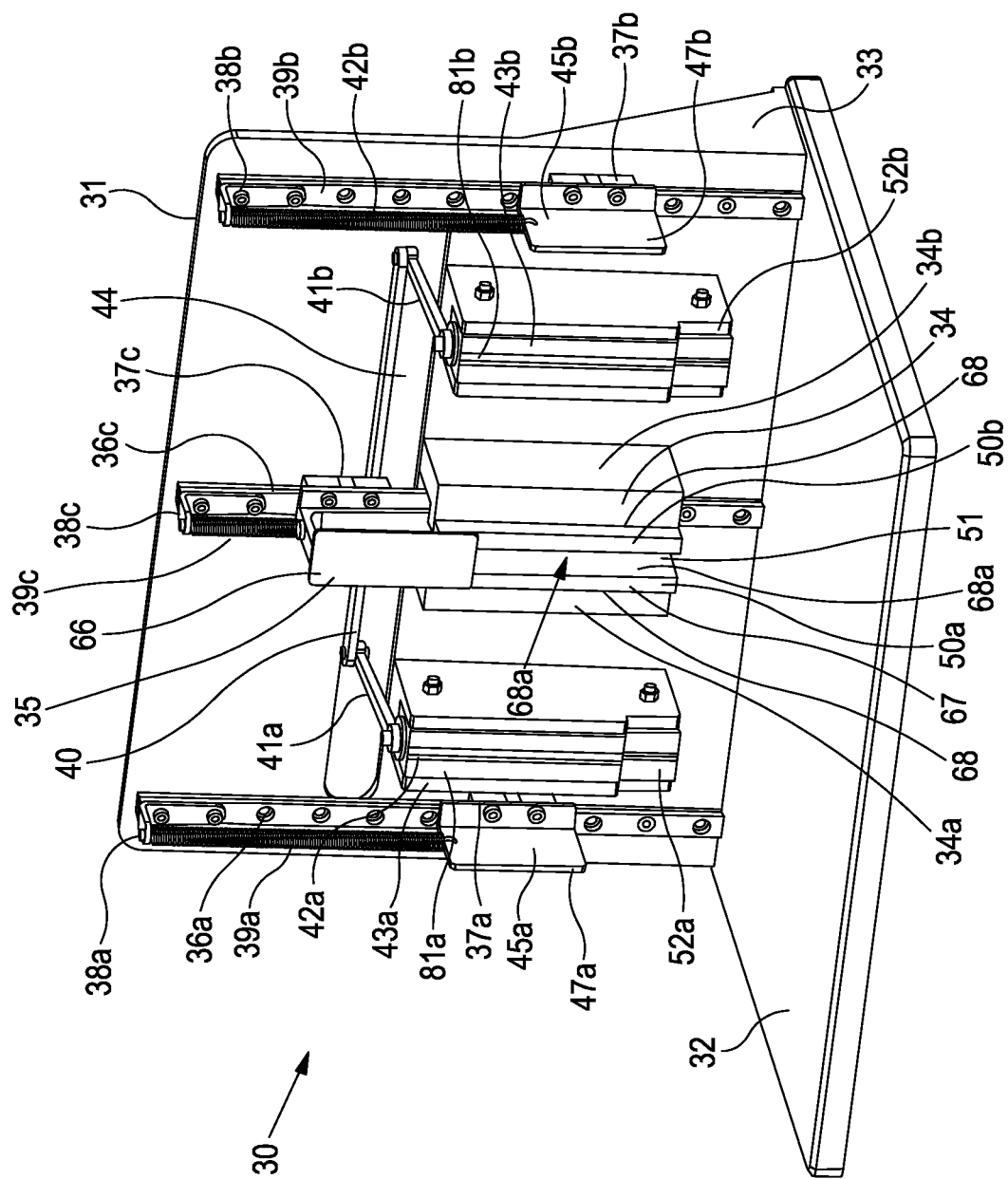
FIG. 1 is a perspective view of alignment apparatus.

FIG. 1 shows an assembly jig 30 comprising a back plate 31, a base plate 32, and a support bracket 33 attached to both the back plate 31 and the base plate 32 to hold the back plate 31 substantially vertical relative to the base plate 32. Guide rails 36a, 36b, 36c are disposed on the back plate 31, each guide rail 36a, 36b, 36c having a corresponding rail carriage 37a, 37b, 37c, slidably mounted for movement along each respective guide rail 36a, 36b, 36c. The guide rail 36c is positioned substantially vertically and attached to the centre of the back plate 31, and the guide rails 36a, 36b are positioned substantially vertically and attached to the back plate 31 towards the side edges between the guide rail 36c and the edges of the back plate 31. Magnetic sliders 45a, 45b are attached to respective rail carriages 37a, 37b, and magnets 47a, 47b are attached to respective magnetic sliders 45a, 45b. An alignment slider 35 is attached to the rail carriage 37c, which in turn, is slidably mounted for movement along the guide rail 36c. Hanger brackets 38a, 38b, 38c are attached onto the guide rails 36a, 36b, 36c at the top edges. An extension spring 39a, 39b is attached between the top edge of each hanger bracket 38a, 38b and each respective magnetic slider 45a, 45b. An extension spring 39c is attached between the top edge of the hanger bracket 38c and the alignment slider 35.

The tension force of the extension springs 39a, 39b, 39c ensures the magnetic sliders 45a, 45b and the alignment slider 35 are held towards the top of the guide rails 36a, 36b, 36c until a downwards force is exerted on them.

The alignment block 34 is attached to the back plate 31 and positioned over the guide rail 37c, and comprises respective first and second alignment members 34a, 34b. The first and second alignment members 34a, 34b comprise respective protrusions 50a, 50b. Each protrusion 50a, 50b has a forward face 67, an external face 68, and an internal face 68a. A channel 51 is defined by the distance between internal faces 68a of protrusions 50a, 50b.

Figure 11:
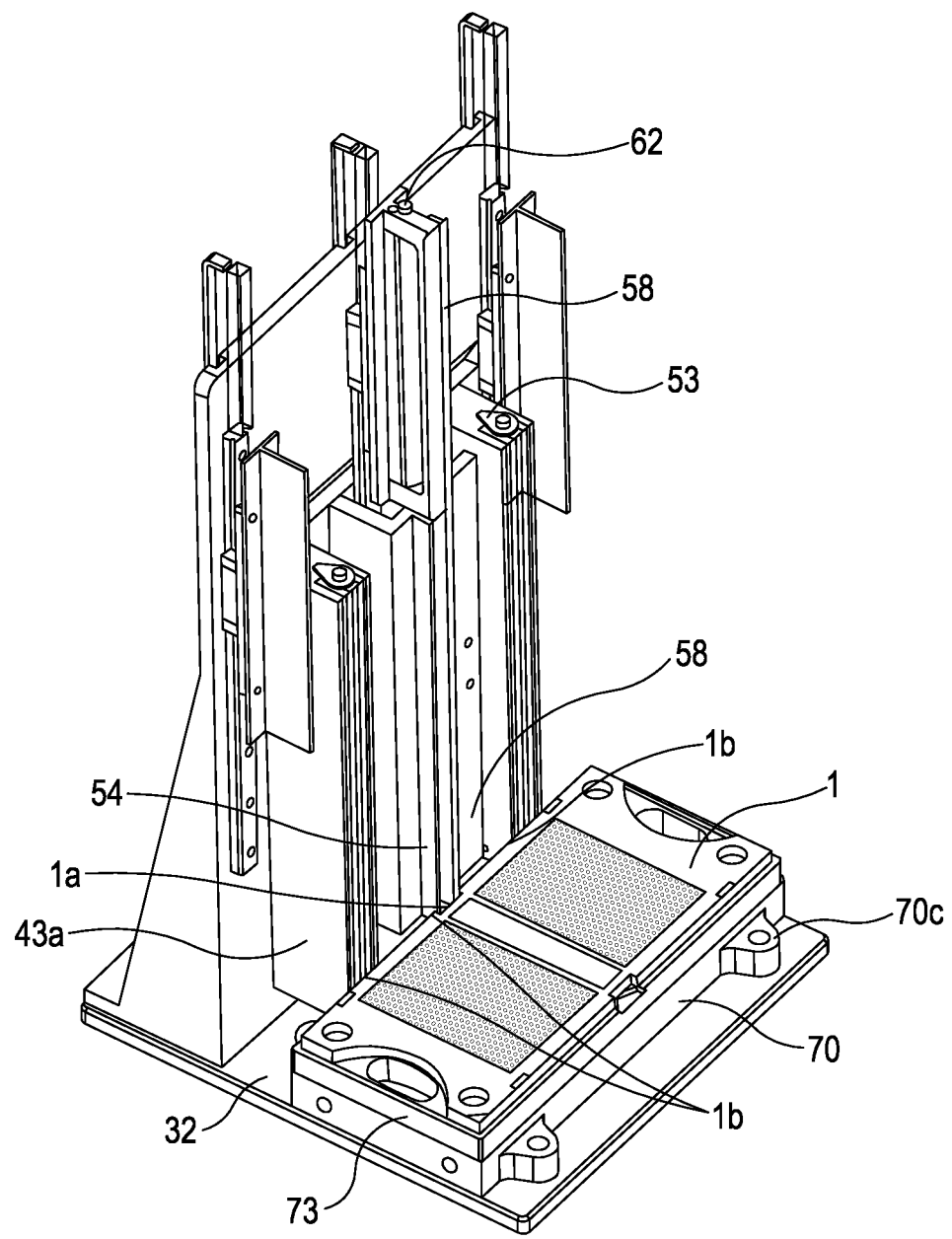
FIG. 11 is a perspective view of the alignment apparatus of FIG. 10.
Figure 12:
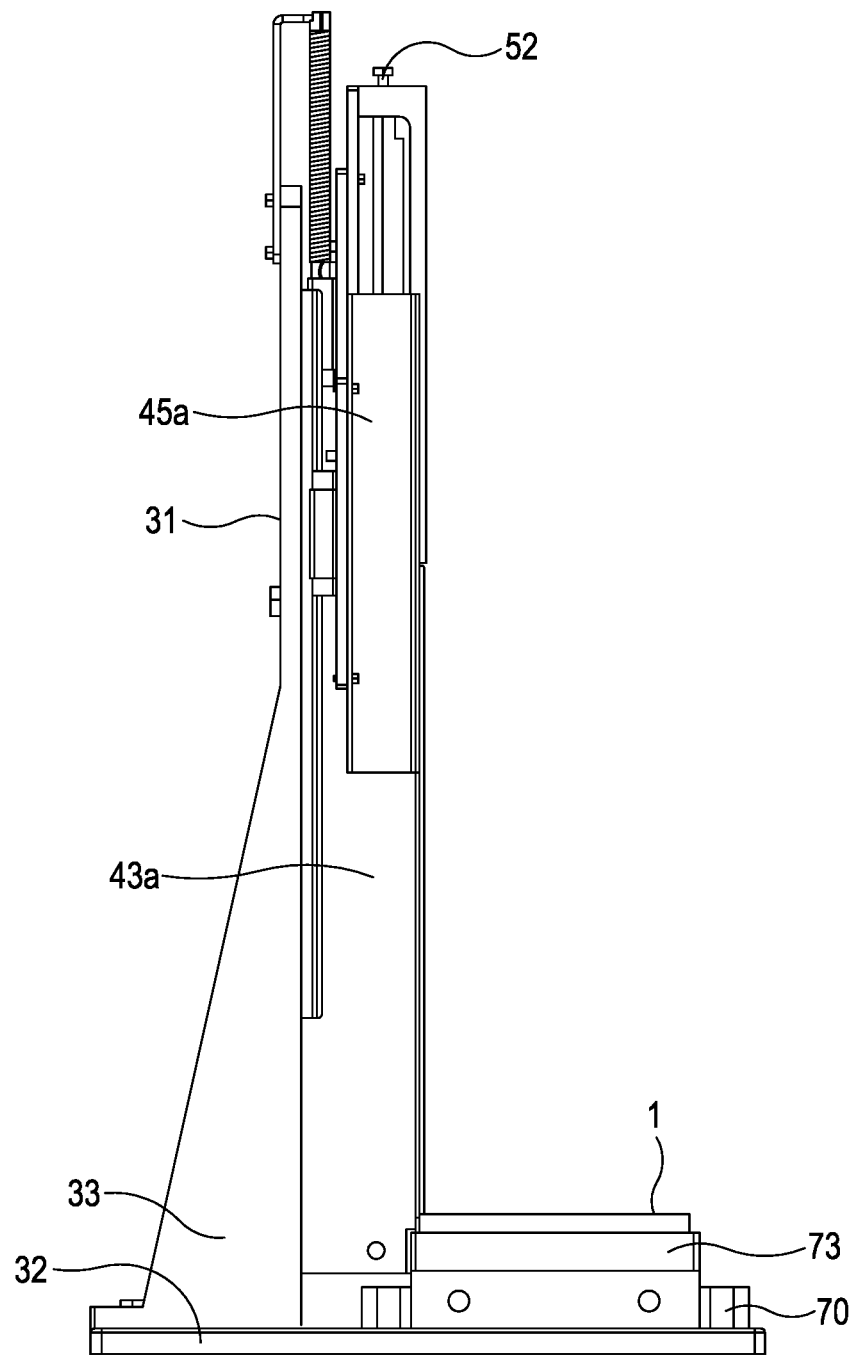
FIG. 12 is a side view of the alignment apparatus of FIG. 10.

The alignment slider 35 is shaped to extend through the channel 51 and has a forward facing alignment face 66 of width greater than that of the channel 51, and corresponding to the width of the notches 1a of the fuel cell units (as shown in FIG. 11 below) and the notches of the current collectors 75a, 75b, see FIG. 4 (below).

Magnetic abutment blocks 43a, 43b are attached to the back plate 31 and disposed between the alignment block 34 and a respective guide rail 36a, 36b. Each magnetic abutment block 43a, 43b comprises a forward abutment surface 81a, 81b and a magnetic rod 42a, 42b. Each magnetic rod 42a, 42b is held substantially vertically and is axially rotatable by movement of a respective link 41a, 41b. Each link 41a, 41b is attached to the top of the respective magnetic rod 42a, 42b and extends rearwardly through a slot 44 in the assembly jig back plate 31. At the rear of assembly jig back plate 31, a lever 40 is attached to the links 41a, 41b and can be moved to rotate the magnetic rods 42a, 42b.

Each magnetic abutment block 43a, 43b comprises a stepped portion shaped to define a recess 52a, 52b at the bottom edges of the abutment block 43a, 43b. The forward abutment surface 82a, 82b of the recess is further back than the forward abutment surface 81a, 81b of the magnetic abutment block 43a, 43b.

Figure 4:
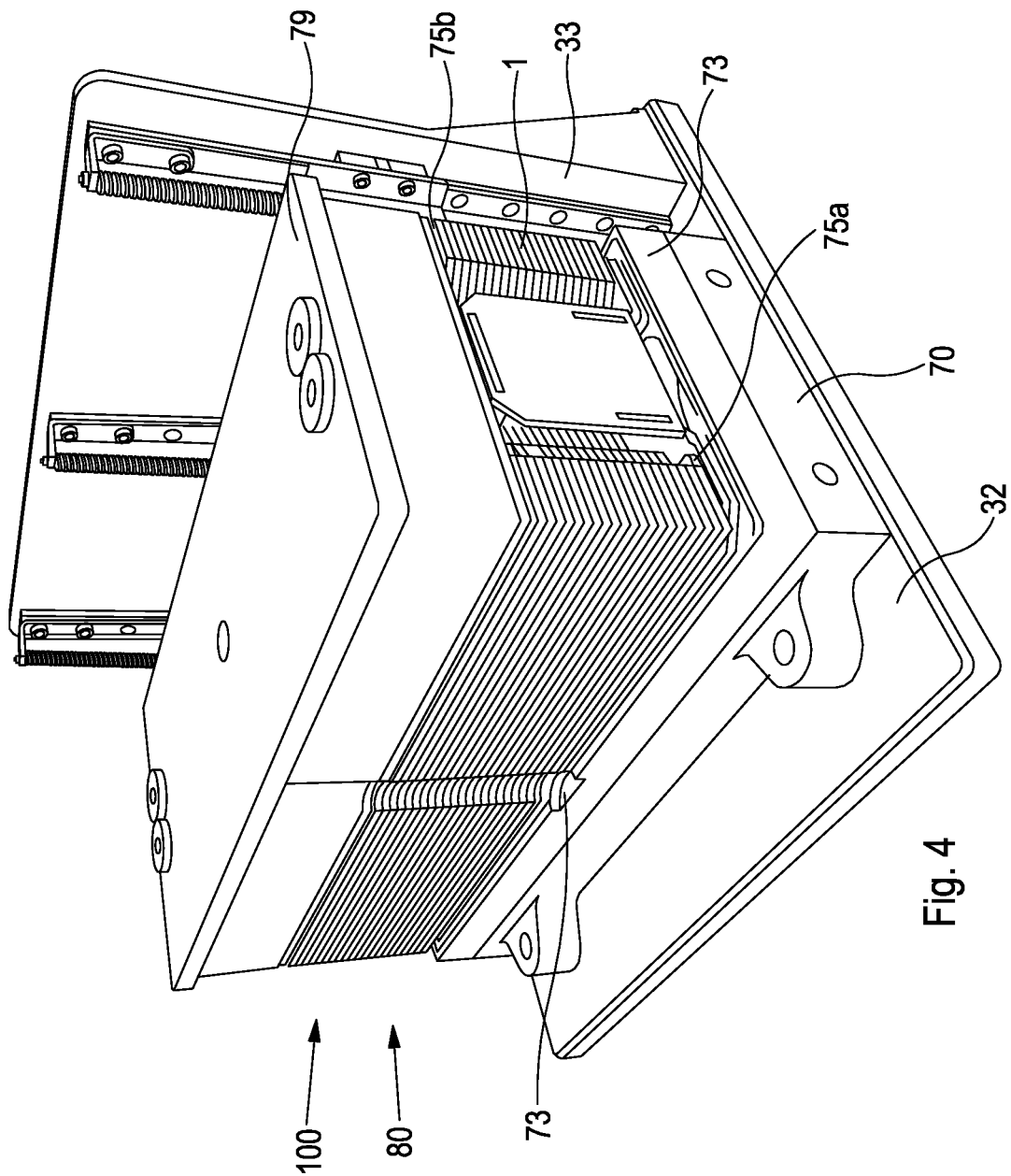
FIG. 4 is a perspective view of the alignment apparatus of FIG. 3 with a fuel cell stack and fuel cell stack end plate.
Figure 9:
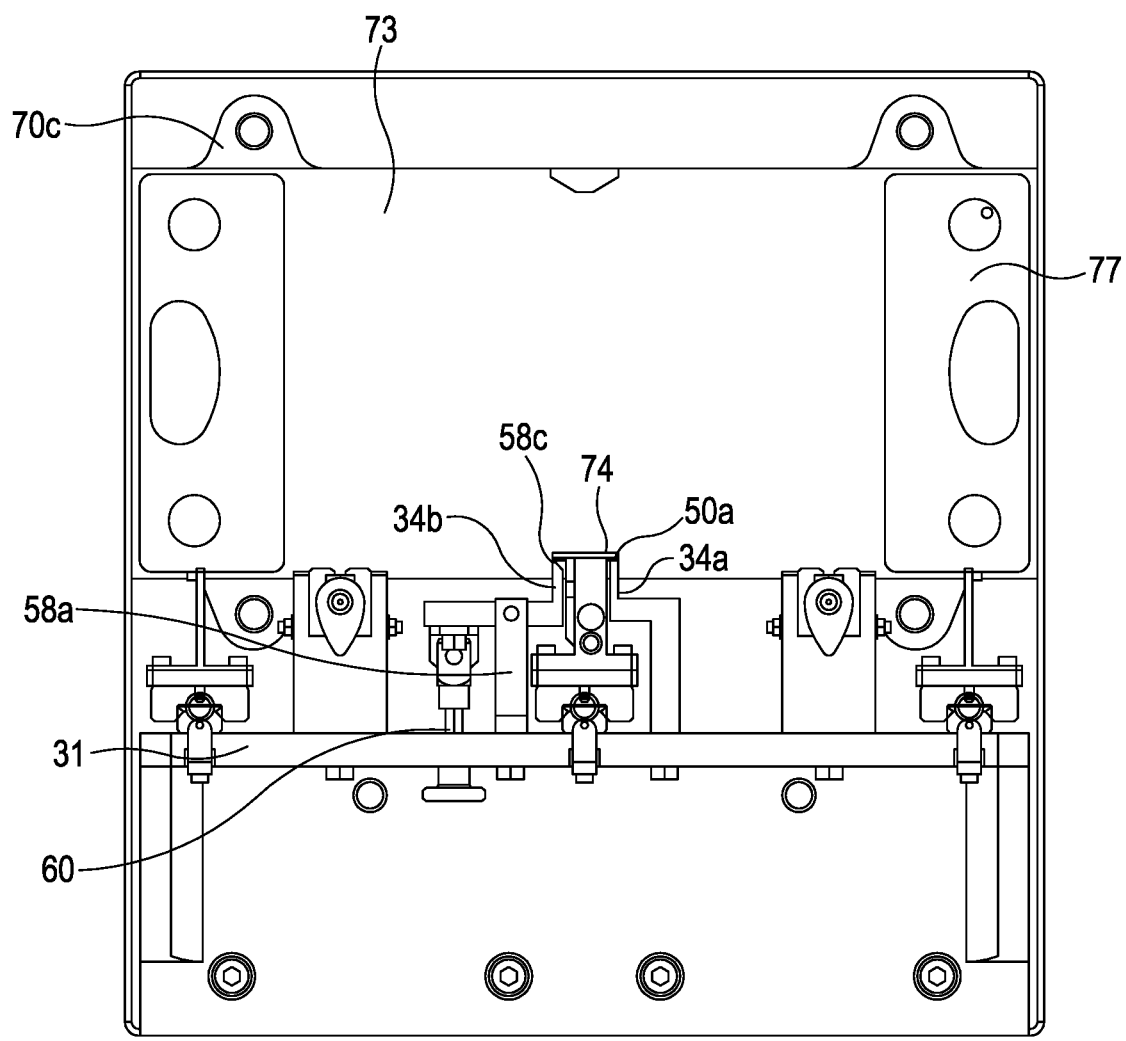
FIG. 9 is a top view of the alignment apparatus of FIG. 8.
Figure 10:
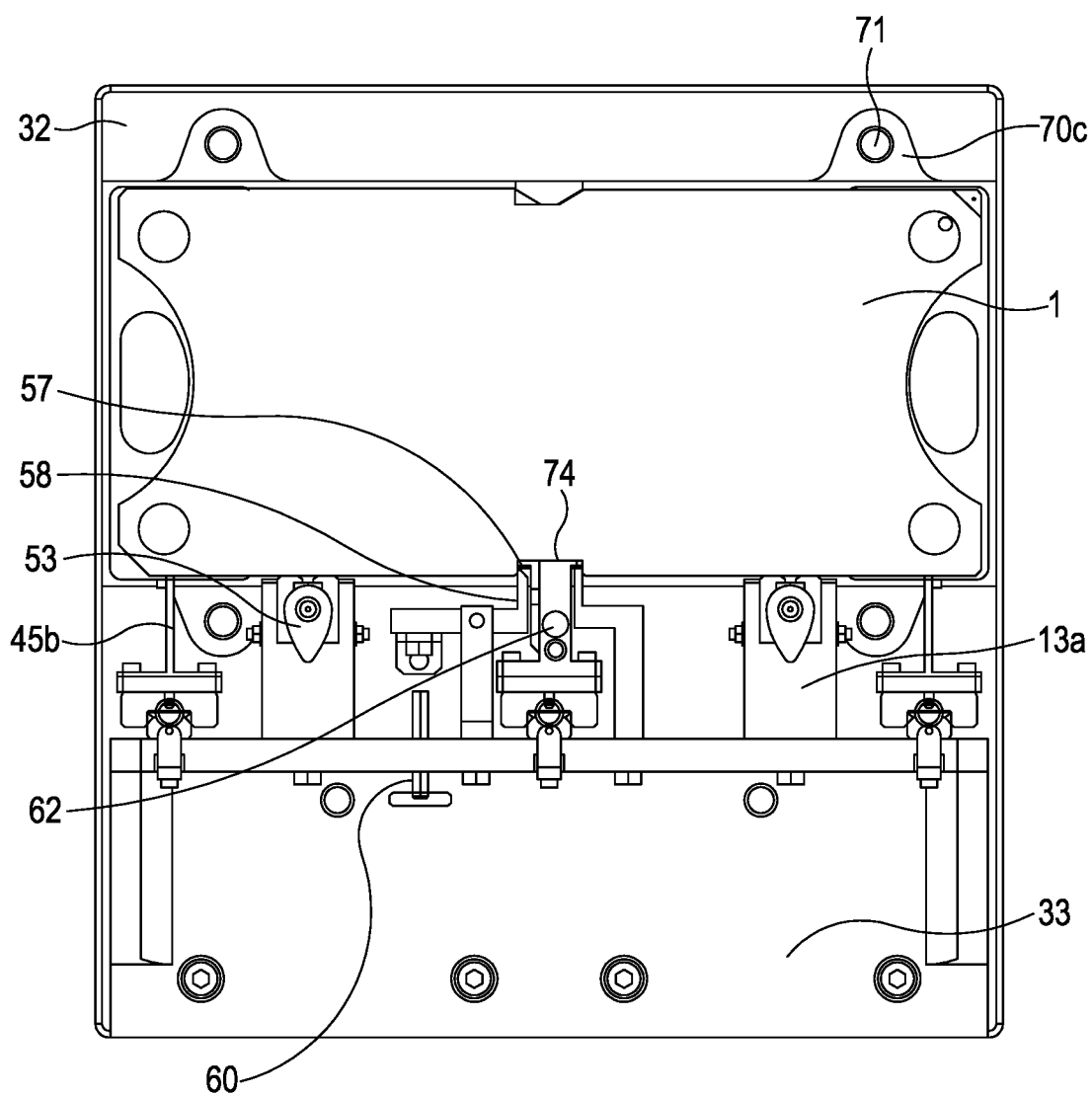
FIG. 10 is a top view of the alignment apparatus of FIG. 9 with a fuel cell unit.

As seen in FIG. 4, a metal-supported solid oxide fuel cell stack assembly 100 comprises a metal fuel cell stack base plate 73, a metal end plate 79, and a fuel cell stack 80 disposed between the fuel cell stack base plate 73 and fuel cell stack end plate 79. Thermiculite® insulating gaskets 77 are present between the fuel cell stack 80 and the fuel cell stack base plate 73 (FIG. 9), and between the fuel cell stack 80 and the fuel cell stack end plate 79. The fuel cell stack 80 comprises at least two fuel cell units 1. Insulating gaskets are disposed between each fuel cell unit 1, specifically around the fuel inlet/outlet ports located at each corner or the fuel cell units 1.

Figure 2:
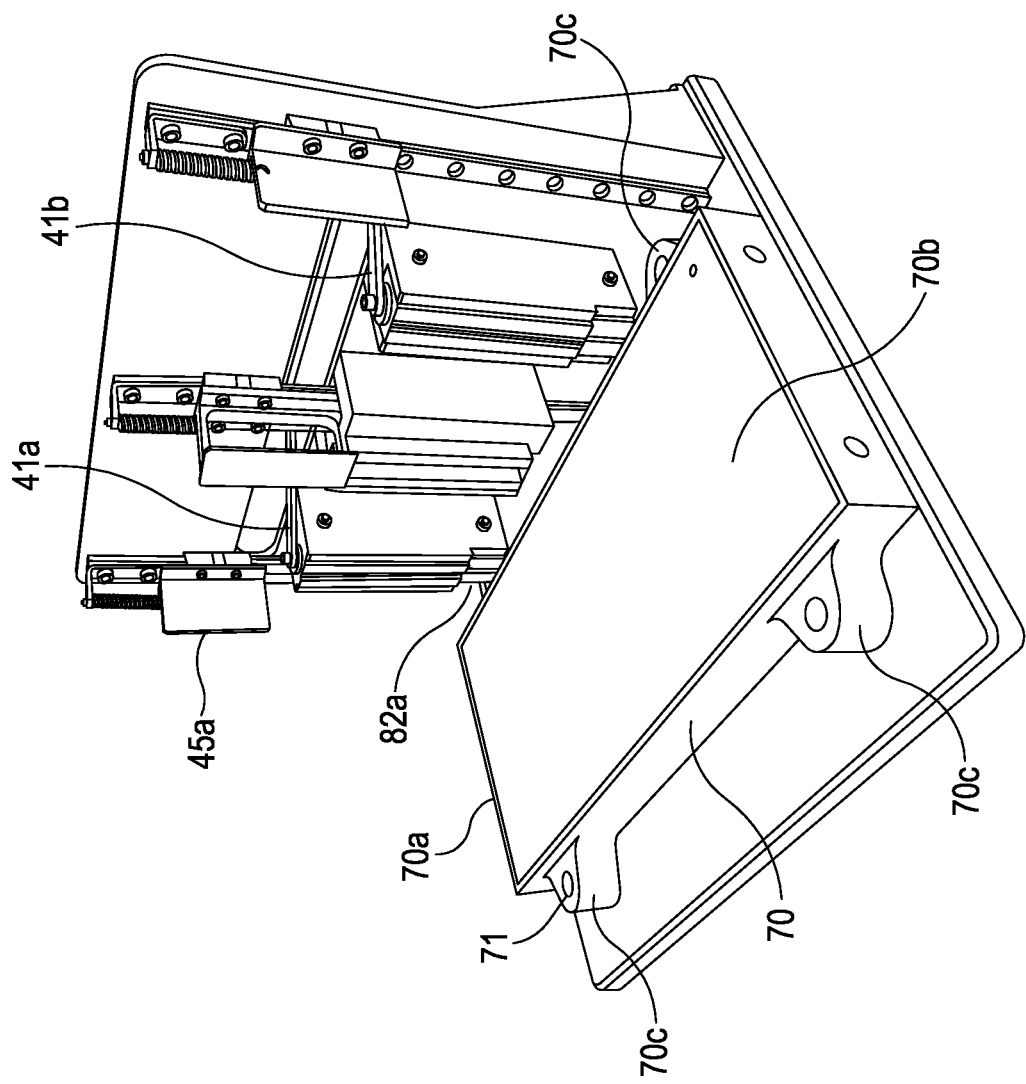
FIG. 2 is a perspective view of the alignment apparatus of FIG. 1 with a compression base plate.

A metal-supported solid oxide fuel cell stack assembly 100 is assembled using the assembly jig 30. In a first step (FIG. 2), a compression base plate 70 is placed on the assembly jig base plate 32 and positioned such that it abuts the recesses 52a, 52b of the magnetic abutment blocks 43a, 43b. The compression base plate 70 has a rim 70a extending around the perimeter of the upper surface 70b, and four female threaded protrusions 70c, each of which defines an assembly bar hole 71 for receiving an assembly bar 72.

Figure 3:
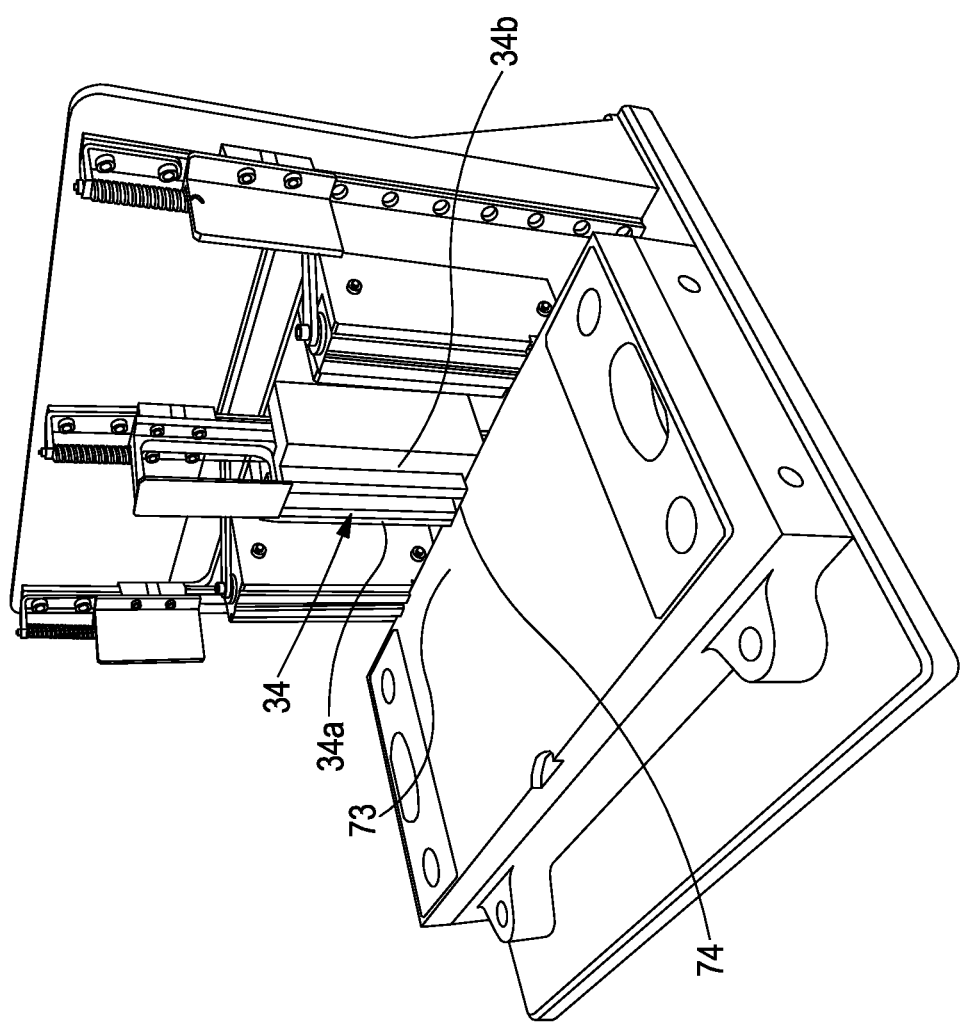
FIG. 3 is a perspective view of the alignment apparatus of FIG. 2 with a fuel cell stack base plate.

As seen in FIG. 3, the fuel cell stack base plate 73 (fabricated from ferritic stainless steel) is placed on the upper surface 70b of the compression base plate 70, mating with the rim 70a to ensure correct relative positioning. A cut-out 74 (which defines a notch) of the fuel cell stack base plate 73 is aligned with the first and second alignment members 34a, 34b of the alignment block 34. This achieves an initial alignment of the fuel cell stack base plate 73 (and therefore also of the compression base plate 70).

As seen in FIG. 4, a Thermiculite® gasket layer 77 (an electrically insulating compression gasket) is then placed on top of the fuel cell stack base plate 73 to provide thermal and electrical insulation. A current collector 75a (negative power take-off plate; fabricated from ferritic stainless steel) is then placed on top. The current collector 75a comprises a notch (not shown) which is aligned with the first and second alignment members 34a, 34b.

To further assist in alignment, current collector 75a abuts (and is attracted to) magnetic abutment blocks 43a, 43b, retaining it in place. At this stage, the lever 40 is positioned such that the links 41a, 41b orient the magnetic rods 42a, 42b to an "on" position in which the (north-south) magnetic axis of the magnetic rods 42a, 42b is generally perpendicular to the longitudinal axis of the fuel cell stack base plate 73, i.e., the current collector 75a is attracted towards the magnetic abutment blocks 43a, 43b.

A first fuel cell unit 1 is then placed on top of the current collector 75a. The fuel cell unit 1 is a prefabricated solid oxide fuel cell unit and comprises (in order) the following layers: a metal substrate, a metal spacer, and a metal interconnect plate, all made from ferritic stainless steel. A fuel cell is disposed on the external surface of the metal substrate.

The fuel cell unit 1 has a notch 1a (FIG. 11) which mates with (is aligned with) the first and second alignment members 34a, 34b of the alignment block 34. The longitudinal outside edge 1b of the fuel cell unit 1 abuts (and is attracted to) the magnetic abutment blocks 43a, 43b, retaining it in place. Thermiculite® gaskets are then placed on the top of the first fuel cell unit (i.e., on top of the metal interconnect plate layer). A second fuel cell unit 1 is then placed on top and positioned in the same way as the first fuel cell unit 1, and Thermiculite® gaskets placed on top. The process is then repeated as appropriate to give the desired total number of layers of fuel cell units 1 in the fuel cell stack 80. A current collector 75b (positive power take-off plate; fabricated from ferritic stainless steel) is then placed on top. The current collector 75b comprises a notch (not shown) which is aligned with the first and second alignment members 34a, 34b. A Thermiculite® gasket layer 77 (an electrically insulating compression gasket) is then placed on top of the current collector 75b to provide thermal and electrical insulation. At this stage, the fuel cell stack 80 is formed. The total height of the fuel cell stack 80 (plus the gasket layer 77 and current collector 75b) is greater than that of the alignment block 34 and the magnetic cradles 43a, 43b, i.e., it extends above the top of the alignment block 34 and the magnetic cradles 431a, 43b.

Figure 5:
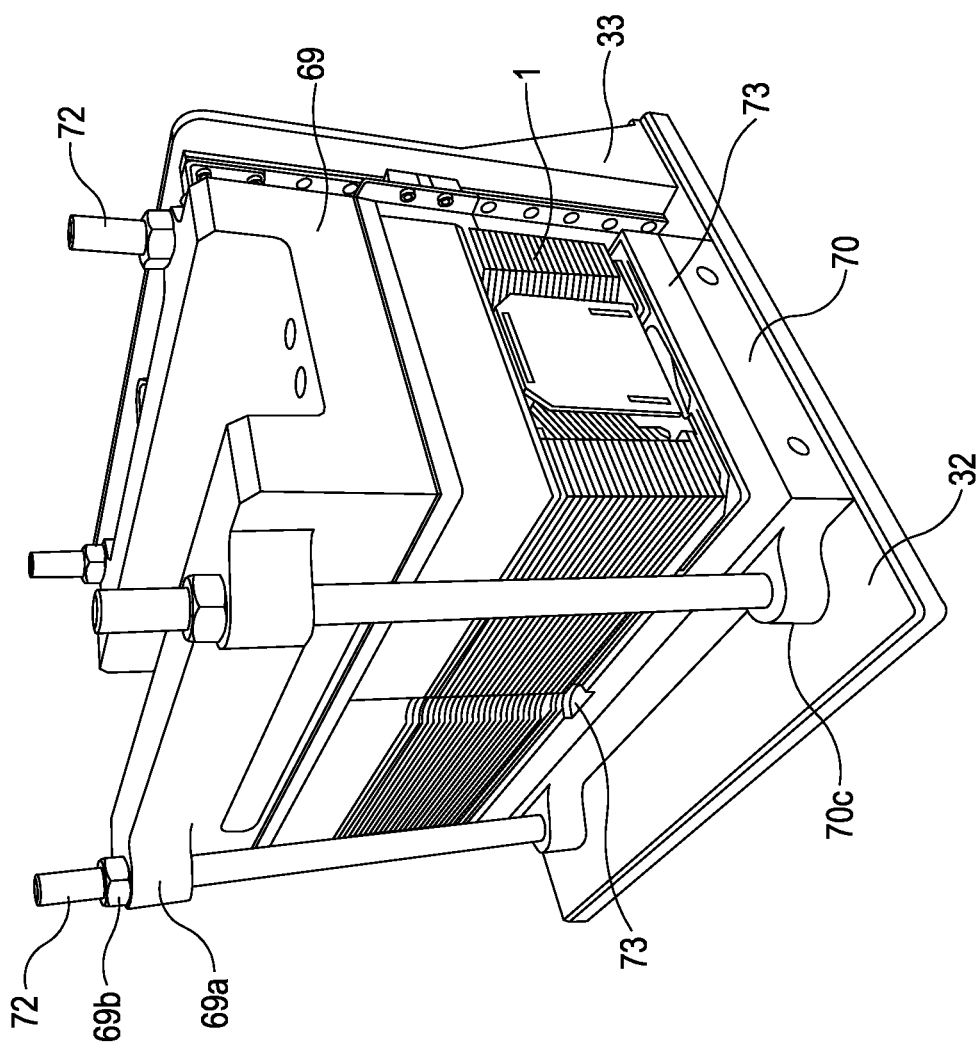
FIG. 5 is a perspective view of the alignment apparatus of FIG. 4 with a fuel cell stack end plate and compression means.

To further enhance alignment of components in fuel cell stack 80, a partial compression and alignment step is performed (FIG. 5). The fuel cell stack end plate 79 (fabricated from ferritic stainless steel) is placed on top of the Thermiculite® gasket layer 77. The fuel cell stack end plate 79 does not include a notch portion complimentary to the protrusions 50a, 50b of the first and second alignment members 34a, 34b and to the guide slider 35. Instead, in this partial compression and alignment step, the fuel cell stack end plate 79 is placed on top of the alignment slider 35 and the magnetic sliders 45a, 45b. A compression end plate 69 is placed on top of the fuel cell stack end plate 79. The threaded assembly bars 72 are then passed through orifices 69a of the compression end plate 69 and screwed into the female threaded protrusions 70c of the compression base plate 70. Compression nuts 69b are then screwed onto the threaded assembly bars 72 to abut the top surface of the compression end plate 69. By further tightening the compression nuts 69b, compressive force is then exerted between the compression base plate 70 and the compression end plate 69. The compression nuts 69b retain the compression end plate 69 in place, i.e., retain the compressive force exerted between the compression base plate 70 and the compression end plate 69. The compression nuts 69b are tightened/screwed down, the causing compression end plate 69, the fuel cell stack end plate 79, the alignment slider 35, and the magnetic sliders 45a, 45b to be compressed together, with the alignment slider 35 being slid downwards along the channel 51. The forward-facing alignment face 66 of the alignment slider 35 contacts the fuel cell units 1 and pushes them away from the assembly jig back plate 31, i.e., away from the magnetic abutment blocks 43a, 43b. The resulting tension between magnetic forces pulling the fuel cell units 1 toward the magnetic abutment blocks 43a, 43b and the alignment face 66 constraining that movement results in an enhanced alignment of the fuel cell units 1 of the fuel cell stack 80. The magnetic sliders 45a, 45b act to attract the metal components (particularly the fuel cell units 1) from their sides (i.e., generally parallel to the longitudinal axis of the fuel cell stack base plate 73) so as to reduce the risk of individual fuel cell units 1 being bumped out of position as the alignment slider 35 contacts and moves them.

A partially compressed state is thus achieved in which the fuel cell units 1 and current collectors 75a, 75b are aligned against the alignment face 66 of the alignment slider 35. The solid oxide fuel cell stack assembly 100 (and the fuel cell stack 80 within it) is now in an aligned and partially compressed state and is retained between the compression base plate 70 and the compression end plate 69. The lever 40 is positioned such that the links 41a, 41b orient the magnetic rods 42a, 42b to an "off" position in which the (north-south) magnetic axis of the magnetic rods 42a, 42b is generally parallel to the longitudinal axis of the fuel cell stack base plate 73, reducing the attraction of the current collector 75a, fuel cell units 1, and current collector 75b towards the magnetic abutment blocks 43a, 43b. With the magnetic attraction reduced, the solid oxide fuel cell stack assembly (and the compression base plate 70 and the compression end plate 69) can be removed from assembly jig 30.

Embodiment 2

Figure 6:
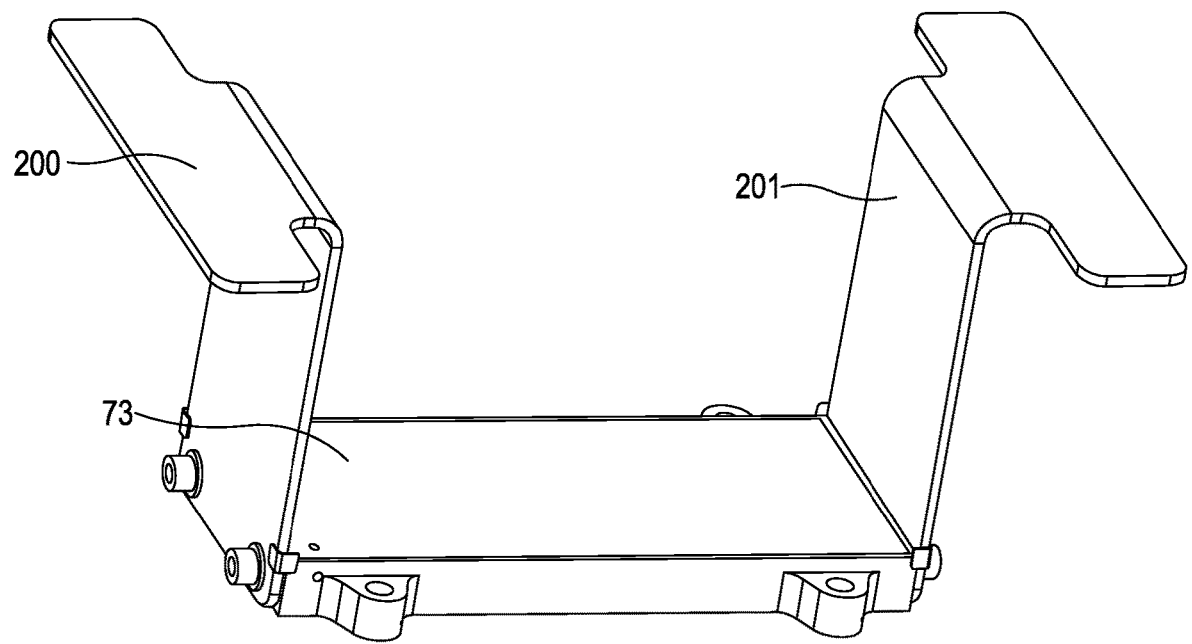
FIG. 6 is a perspective view of a compression base plate with L-shaped side plates attached.

This embodiment is essentially the same as Embodiment 1, except that side-plates 200, 201 are attached to the sides of the compression base plate 70 (FIG. 6). In this embodiment, the L-shaped side plates 200, 201 can act to assist in the assembly process by guiding the various components towards the alignment components (alignment block 34 etc.). The side plates 200, 201 also assist in assembly by reducing the risk of component parts of fuel cell stack assembly 100 being knocked out of position, e.g., by operators before compression takes place. The side plates 200, 201 also reduce the risk of accidental damage to the fuel cell stack assembly 100 when it is separated from the assembly jig 30, e.g., during movement or storage.

Embodiment 3

Figure 7:
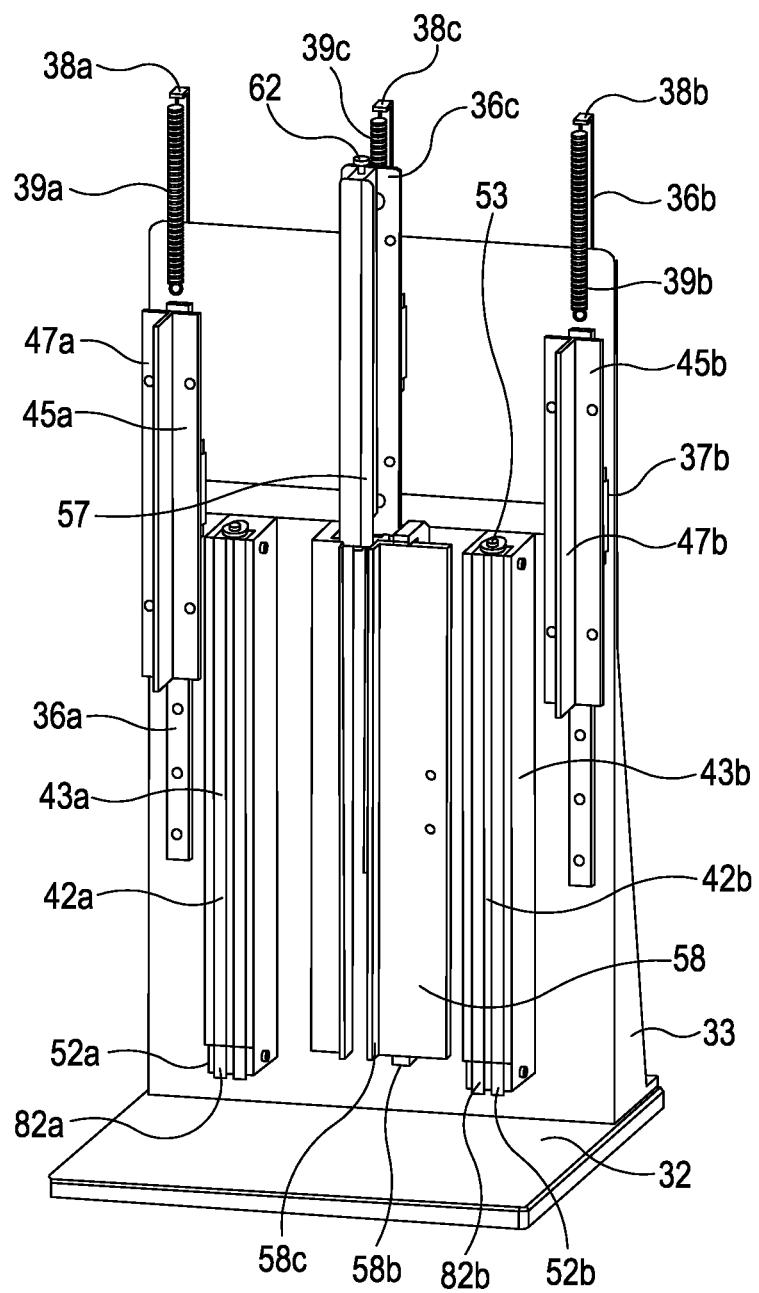
FIG. 7 is a perspective view of a second alignment apparatus.
Figure 8:
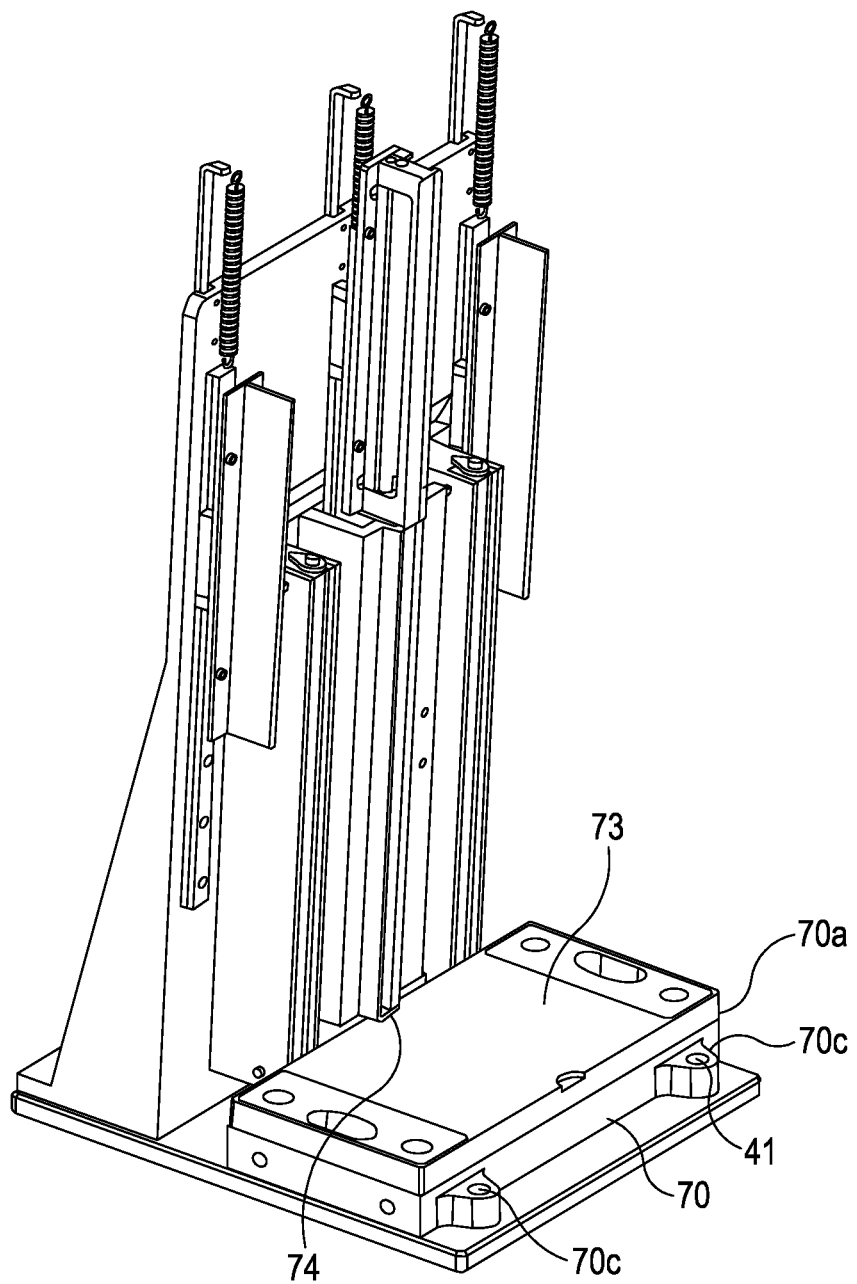
FIG. 8 is a perspective view of the alignment apparatus of FIG. 7 with a compression base plate and fuel cell stack base plate.

This embodiment is essentially the same as Embodiment 1, except that alignment is further enhanced by virtue of a modification to the second alignment member 34b. In this embodiment, the alignment member 34b comprises first and second support members 58a, 58b between which is mounted a rotatable gate member 58. The rotatable gate member 58 has a generally L-shaped cross-section and is rotatable about an axis defined between the first and second support members 58a, 58b (FIG. 7). The rotatable gate member 58 includes a protrusion 58c which corresponds to the protrusion 50b of Embodiment 1. An adjustment nut 60 (FIG. 9) extends through the assembly jig back plate 31 and engages with the rotatable gate member 58 to actuate it. In this way, rotation of the adjustment nut 60 exerts a force upon the rotatable gate member 58 and causes it to rotate, i.e., expands it away from the first alignment member 34a.

In the process of forming a fuel cell stack assembly 100, prior to the partial compression and alignment step being performed, the adjustment nut 60 is rotated to cause the rotatable gate member 58 to rotate, moving the protrusion 58c away from the protrusion 50a (i.e., expanding the second alignment member 34b away from the first alignment member 34a), and exerting a force upon the sides of the notches 1a and the notches of the current collectors 75a, 75b, thus enhancing alignment. Assembly is then continued essentially as in Embodiment 1.

Embodiment 4

Figure 13:
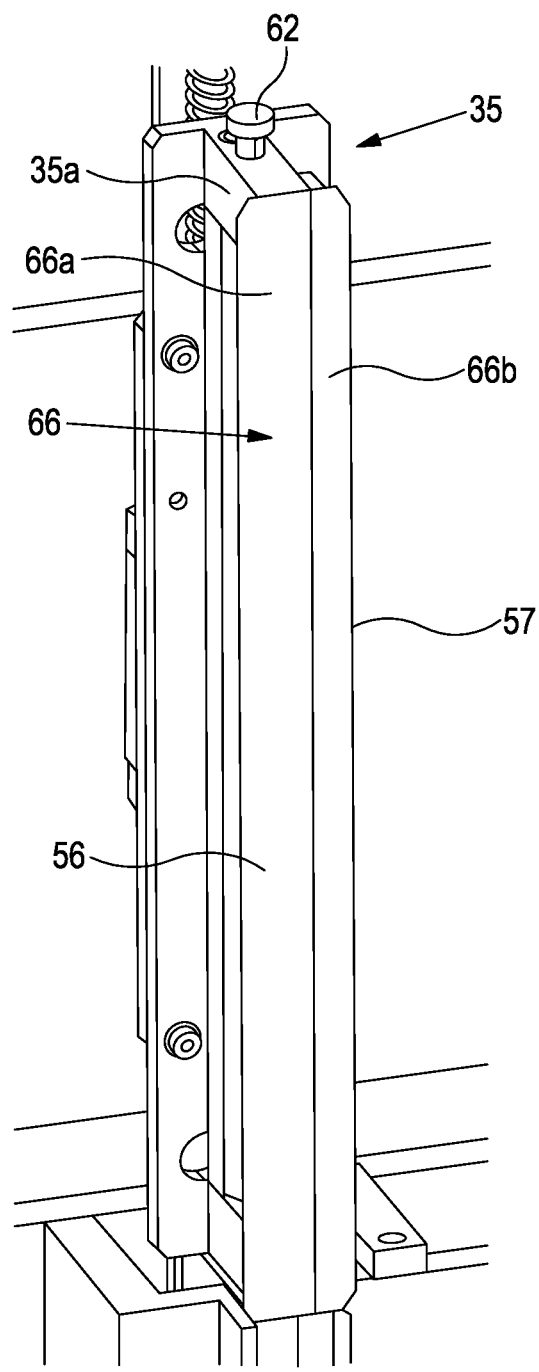
FIG. 13 is a perspective view of a section of the alignment apparatus of FIG. 9.
Figure 14:
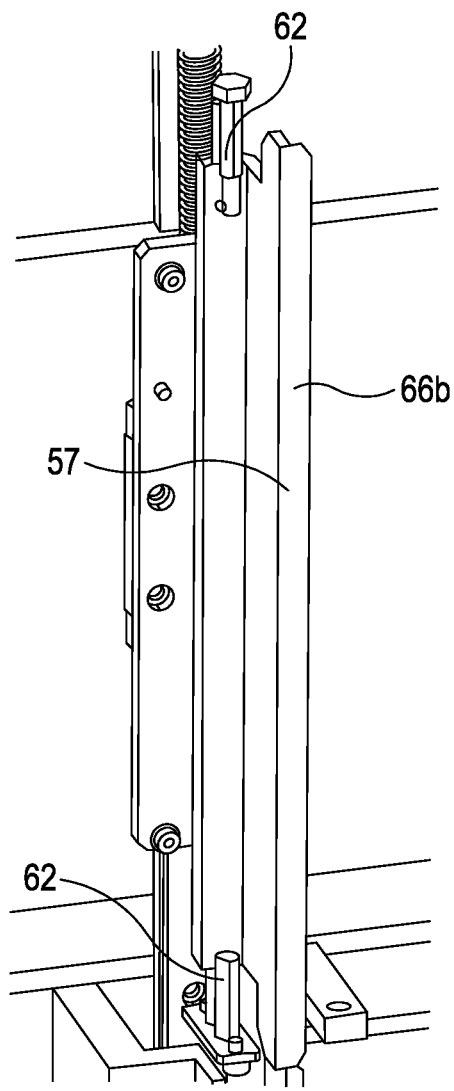
FIG. 14 is a partial cut-away view of FIG. 13.
Figure 15:
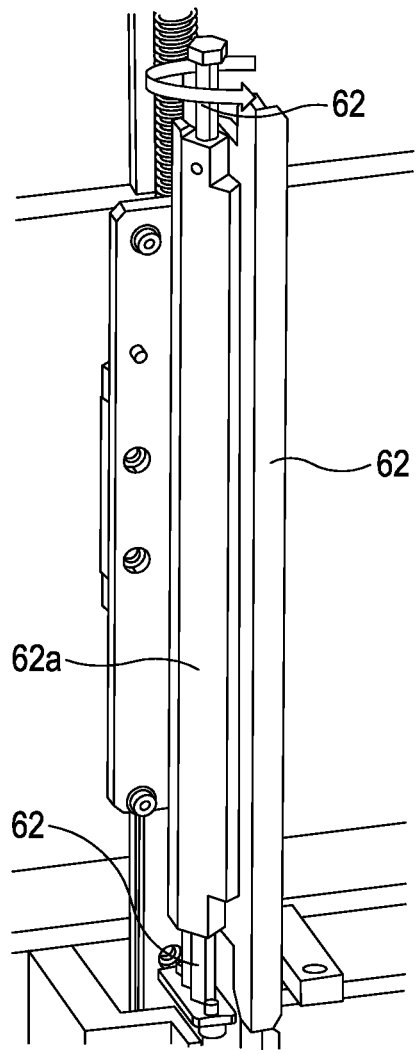
FIG. 15 is a partial cut-away view of FIG. 13 and operation of an expansion member (a pushing element).
Figure 16:
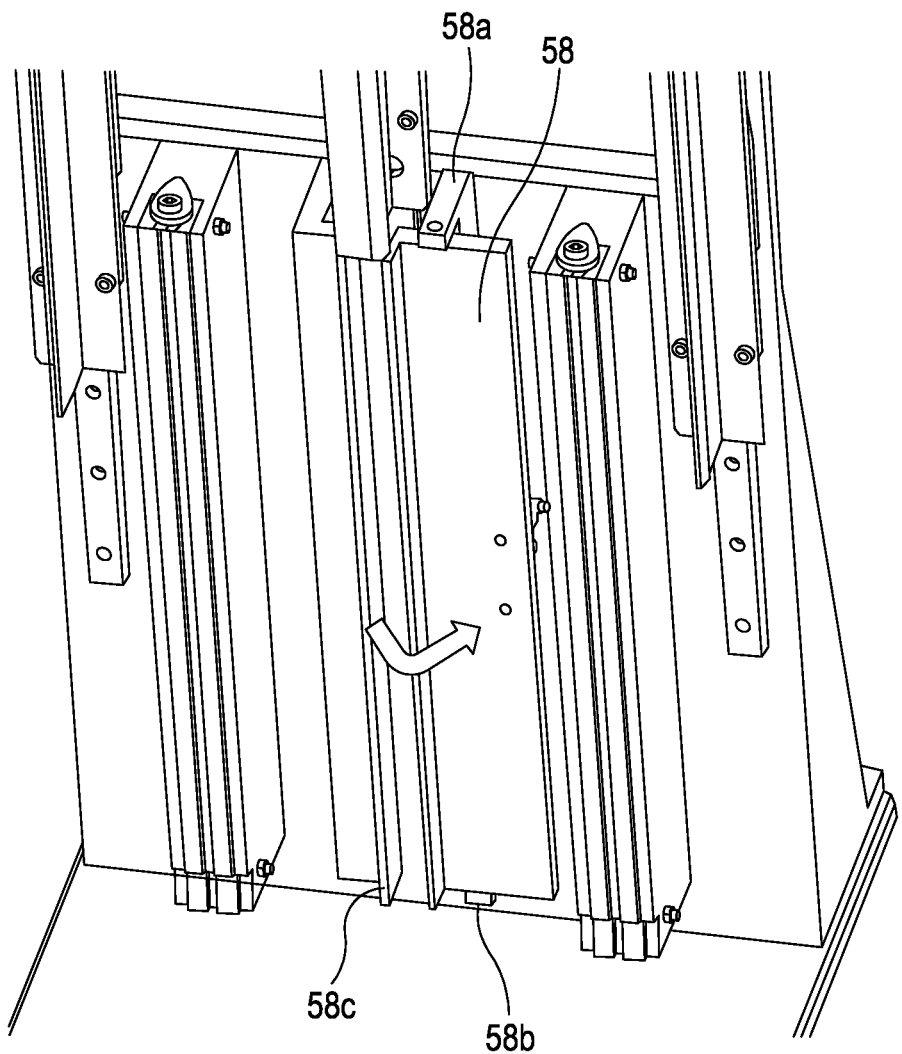
FIG. 16 is a perspective view of FIG. 7 and operation of an expansion member (a rotatable gate).

This embodiment is essentially the same as Embodiment 1, except that alignment is further enhanced by virtue of a modification to the alignment slider 35. In this embodiment, the alignment slider 35 comprises a first member 35a attached to the rail carriage 37c and defining a first portion 66a of the alignment face 66 (FIGS. 13-15). The threaded rod 62 passes through the first member 35a, and a pushing element 62a is mounted on the threaded rod 62. The threaded rod 62 protrudes at the top of the alignment slider 35, allowing it to be rotated, i.e., allowing the pushing element 62a to be rotated. The alignment slider 35 also comprises an expansion member in the form of rotatable alignment slider 57. Rotatable alignment slider 57 is rotatably mounted on first member 35a and is rotatable about an axis generally parallel to that of threaded rod 62. Rotatable alignment slider 57 defines a second portion 66b of alignment face 66, adjacent first portion 66a. Rotation of threaded rod 62 thus rotates pushing element 62a, which in turn contacts and pushes the rotatable alignment slider 57, causing the second portion 66b of the alignment face 66 to rotate away from the first portion 66a.

In the process of forming a fuel cell stack assembly 100, during the partial compression and alignment step (particularly, at the end of the partial compression and alignments step when the partially compressed state is achieved), the threaded rod 62 is rotated, causing the second portion 66b of the alignment face 66 to rotate away from the first portion 66a (i.e., causing the alignment slider 35 to expand), and exerting a force upon the sides of the notches 1a and the notches of the current collectors 75a, 75b. Thus, additional alignment is achieved.

As the height of a fuel cell stack assembly 100 increases, particularly as the height of a fuel cell stack 80 within a fuel cell stack assembly 100 increases (i.e., with fuel cell stacks 80 having a large number of fuel cell units 1), accuracy of alignment becomes more important. This embodiment is particularly useful in the assembly of such "tall" fuel cell stack assemblies 100.

Embodiment 5

In this embodiment, the features of Embodiments 1, 3 and 4 are combined.

Embodiment 6

In this embodiment, the features of Embodiments 1, 2, 3 and 4 are combined.

Embodiment 7

This embodiment is essentially the same as Embodiment 3, but the lever 40 and the links 41a and 41b are replaced by an indicator 53 which is used to rotate the magnetic rods 42a and 42 b.

Embodiment 8

This embodiment is essentially the same as Embodiment 4, but the lever 40 and the links 41a and 41b are replaced by an indicator 53 which is used to rotate the magnetic rods 42a and 42b.

Further embodiments will be readily apparent to one of ordinary skill in the art without departing from the scope of the appended claims. Reference signs are incorporated in the claims solely to ease their understanding, and do not limit the scope of the claims.

We claim:

1. A fuel cell stack assembly apparatus comprising:
   a base;
   a stack alignment feature extending generally perpendicular to the base configured to align a plurality of ferritic fuel cell units stacked against it into a fuel cell stack assembly, wherein each fuel cell unit comprises a respective first alignment feature complementary in shape to the stack alignment feature; and,
   at least one magnetic abutment extending generally perpendicular to the base configured to attract the plurality of fuel cell units towards the stack alignment feature;
   wherein the stack alignment feature comprises a male feature configured to engage with a female shaped first alignment feature in the fuel cell elements in the form of a notch or recess.

2. The apparatus according to claim 1, wherein the at least one magnetic abutment is activatable for selectively exerting a magnetic alignment force on the plurality of fuel cell units.

3. The apparatus according to claim 1, wherein the at least one magnetic abutment is a permanent magnet that is activatable by altering its position or orientation.

4. The apparatus according to claim 1, wherein the at least one magnetic abutment comprises a device selected from the group comprising an electromagnet device, an electropermanent magnet device, and a switchable permanent magnetic device.

5. The apparatus according to claim 1, wherein the stack alignment feature comprises an expansion mechanism adapted to move outwardly within the first alignment feature of the plurality of fuel cell units for further alignment thereof.

6. The apparatus according to claim 5, wherein the stack alignment feature comprises two elongate members extending generally perpendicular to the base at least one of which is expandable away from the other.

7. The apparatus according to claim 1, wherein the stack alignment feature comprises a rotatable mechanism adapted to move outwardly within the first alignment feature of the plurality of fuel cell units for further alignment thereof.

8. The apparatus according to claim 7, wherein the stack alignment feature comprises two elongate members extending generally perpendicular to the base at least one of which is rotatable away from the other.

9. The apparatus according to claim 1, further comprising an alignment slider mounted for sliding movement generally perpendicular to the base against the plurality of fuel cell units for further alignment thereof.

10. The apparatus according to claim 9, wherein the alignment slider is mounted for sliding movement along the stack alignment feature.

11. The apparatus according to claim 9, wherein the alignment slider is mounted for sliding movement in a gap defined between the stack alignment feature and adjacent respective first alignment features of a stack of fuel cell units.

12. The apparatus according to claim 9, wherein the alignment slider is slidably mounted on a rail and supported by a spring mechanism providing an upward return force.

13. The apparatus according to claim 1, further comprising a magnetic slider mounted for sliding movement generally perpendicular to the base against the plurality of fuel cell units for further alignment thereof.

14. The apparatus according to claim 13, wherein the magnetic slider is mounted so as to exert a magnetic force acting perpendicular to the magnetic force of the at least one magnetic abutment.

15. The apparatus according to claim 13, wherein the magnetic slider is slidably mounted on a rail and supported by a spring mechanism providing an upward return force.

16. The apparatus according to claim 1, wherein a guide member is provided on the base for assisting in positioning the plurality of fuel cell units.

17. A method of manufacture of a fuel cell stack assembly using fuel cell stack assembly apparatus according to claim 1, wherein the method comprises the steps of:
   stacking a plurality of fuel cell units upon each other on the base with their respective first alignment features against the stack alignment feature, such that the fuel cell units are attracted towards the stack alignment feature by virtue of the magnetic force of the at least one magnetic abutment.

18. The method according to claim 17, wherein the stack alignment feature comprises an expansion mechanism adapted to move outwardly within the first alignment feature of the plurality of fuel cell units for further alignment thereof, wherein the method comprises the steps of:
- stacking a plurality of fuel cell units upon each other on the base with their respective first alignment features against the stack alignment feature, such that the fuel cell units are attracted towards the stack alignment feature by virtue of the magnetic force of the at least one magnetic abutment; and
- performing a further alignment step by moving the expansion mechanism and/or rotatable mechanism outwardly within the first alignment feature of the plurality of fuel cell units for further alignment thereof.

19. A method according to claim 17, wherein the stack alignment feature comprises a rotatable mechanism adapted to move outwardly within the first alignment feature of the plurality of fuel cell units for further alignment thereof, wherein the method comprises the steps of:
- stacking a plurality of fuel cell units upon each other on the base with their respective first alignment features against the stack alignment feature, such that the fuel cell units are attracted towards the stack alignment feature by virtue of the magnetic force of the at least one magnetic abutment; and
- performing a further alignment step by moving the rotatable mechanism outwardly within the first alignment feature of the plurality of fuel cell units for further alignment thereof.

20. A method of manufacture of a fuel cell stack assembly using fuel cell stack assembly apparatus according to claim 9, wherein the method comprises the steps of:
- stacking a plurality of fuel cell units upon each other on the base with their respective first alignment features against the stack alignment feature, such that the fuel cell units are attracted towards the stack alignment feature by virtue of the magnetic force of the at least one magnetic abutment; and
- performing a further alignment step by sliding the alignment slider against the plurality of fuel cell units for further alignment thereof.

21. A method according to claim 20, wherein the at least one magnetic abutment is activatable and the magnetic alignment force is selectively exerted during an assembly step and subsequent compression step, but not during a final removal step.

* * * * *